April 19, 1932. R. W. CHALMERS 1,854,982
SHIPPING DEVICE
Filed Oct. 6, 1928
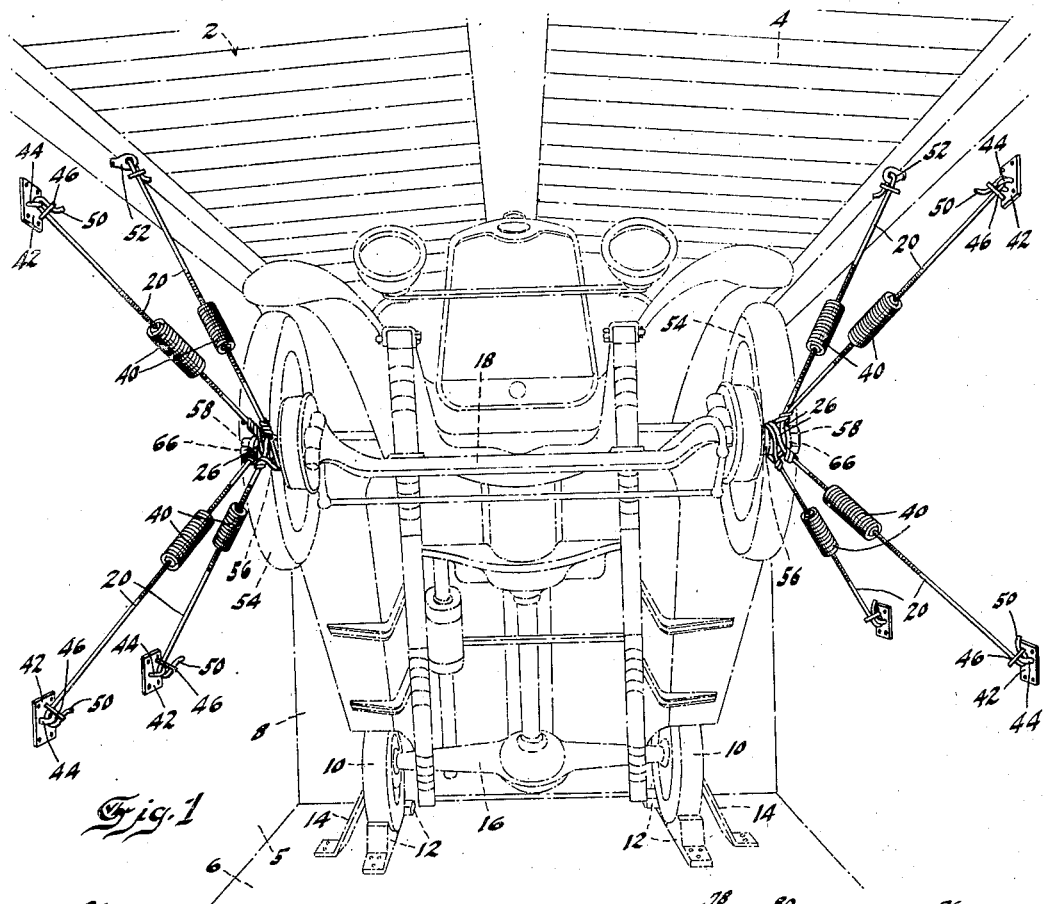

Patented Apr. 19, 1932

1,854,982

UNITED STATES PATENT OFFICE

RAYMOND W. CHALMERS, OF HIGHLAND PARK, MICHIGAN, ASSIGNOR TO GENERAL MOTORS CORPORATION, OF DETROIT, MICHIGAN, A CORPORATION OF DELAWARE

SHIPPING DEVICE

Application filed October 6, 1928. Serial No. 310,743.

This invention relates to a means for supporting a vehicle in a box car or inclosure for shipping purposes.

Shipping devices in use at the present time have invariably made use of a rigid mounting at both the front and the rear of the vehicle to hold it securely in place and prevent moving in the box car or inclosure in which it is mounted. It is old to position or mount the vehicles in the box car over each other, side by side, on end, or where space will not permit, to place the vehicles at an incline so that a portion of one may be placed under the other. The present invention relates to this latter type of positioning or placing of the vehicles in the car.

In mounting an inclined vehicle, the rear end has been secured to the floor so as to prevent lateral and longitudinal movement while the front end has been supported on horses or frames which have been secured or positioned on the car floor or on the car side but these frames have in all instances been rigid, holding the vehicle rigidly and securely in place.

In the present invention it is an object to give a resilient mounting to the raised or free end of the vehicle and at the same time hold it securely in place. The resilient mounting will permit a limited amount of movement to the free end and thereby free the vehicle from the injurious effect of jars or jolts which come from sudden impact. These jars or jolts are necessarily transmitted directly to the vehicle through the rigid mounting and the vehicle therefore is liable to become damaged or some of the parts broken.

The invention is particularly adaptable to vehicles which have an annular flange on their hub cap, such as on the 1928 Chevrolet. Where no flange is on the hub cap, a special cap provided with a flange may be provided for transportation purposes and the conventional or regular cap applied after the car or enclosure is unloaded.

The object of the invention is accomplished by securely mounting the rear of the vehicle to prevent lateral and longitudinal movement and elevating the front end. To the hubs of the front end of the vehicle there is secured the looped end of a resilient suspension means, the opposite end of which is secured to the sides of the enclosure or box car in which the vehicle is loaded. Preferably four of the suspending means are used for each hub.

The invention is disclosed on the accompanying drawings, in which,

Fig. 1 shows the interior of a box car or inclosure with a vehicle mounted therein, in accordance with the invention.

Fig. 2 is one form of the resilient suspending means.

Fig. 3 is a view of the preferred form of suspending means.

Fig. 4 is an enlarged sectional view showing the attachment of the looped ends of the resilient suspending means to the hub.

Fig. 5 is a perspective view of the plate attached to the car side.

Fig. 6 is a sectional view on the line 6—6 of Fig. 3.

Referring to the drawings, the numeral 2 indicates a box car or other suitable inclosure for transporting vehicles. The car has the usual roof 4, sides 5, floor 6 and end 8.

Secured to the floor at suitably spaced apart points to properly receive the rear wheels 10 of the vehicle are the blocks or chocks 12 and extending from the floor to the hubs are the braces 14 which are attached to the hubs and secured to the floor. This structure is conventional and per se forms no part of the present invention. Any other suitable form of retaining means for the rear 16 of the vehicle may be used.

The front end 18 of the vehicle is raised as shown in Fig. 1, leaving the car in an inclined position. The car is resiliently suspended in this position by means of the braces or suspending means 20, preferably four of which are mounted at each side of the front end of the car. While four such braces are shown, nevertheless, more or less may be used as is found desirable.

The braces per se are better illustrated in Fig. 3. From an examination of this figure, it will be noted that the brace comprises the end rod portions 22 and 24, the end portion 22 terminating in a loop 26, while the rod portion 24 terminates in a hook 28. The loop 26 is preferably integral and inclined as shown in Figs. 2 and 3. The adjacent ends 30 and 32 of the rods 22 and 24 are threaded to receive the nuts or end members 34 and 36. The outer peripheries of the members 34 and 36 are spirally grooved as shown at 38 and held by these grooves are the ends of a coil spring 40. The coil spring is screwed into the grooves and forms a fairly rigid and secure connection with the nuts or members 34 and 36.

The ends 30 and 32 of the rods 22 and 24 are screw threaded in opposite directions into the nuts 34 and 36 so that by turning the coil spring 40 a turn-buckle effect is obtained and the rod either shortened or lengthened as desired. This is desirable for the reason that after the rods are in their final position in the enclosure or car, it is usually desirable to make an adjustment to secure a proper resilient mounting.

Secured to the car sides are the plates 42 which have secured thereto, the U-shaped eye 44. When in their final position, the hook shaped ends of the resilient suspension means engage in the eye 44. A holding plate 46 provided with a pair of openings is arranged on each rod 24 and after the hook 28 is in place, the plate 46 is pressed down closely against the eye 44 and the end 48 of the hook is bent as shown at 50 in Fig. 1, to prevent the plate 46 from leaving the hook. This will hold the hook end of the resilient suspension means 20 rigidly in place and prevent the plate 46 from leaving the hook.

In a large number of instances screw eyes 42 are already in place in a box car and where these eyes are found, no plates 42 are used.

The front wheels 54 of the vehicle are provided with the hubs 56 which have screwed thereon the hub caps 58 provided with annular flanges 60. By unscrewing the cap 58, the looped ends 26 of the resilient suspension means 20 may be slipped over the hub. The flange 60 is ordinarily insufficient to provide an adequate support for the outermost loop 26 and a metallic washer 66 is therefore employed to give a greater bearing area for the endmost loop in Fig. 4. This washer is of a size to fit snugly over the hub cap 58 and inasmuch as the space between the flange 60 and the plate 62 for retaining the spokes 64 in position is usually more than the space occupied by the four looped ends the washer 66 also serves as a spacer. The hub cap is now screwed into place, the parts then appearing as shown in Fig. 4. The washer 66 will aid in forming a tight connection and preventing rattle.

By referring to Fig. 2, it will be seen that there has been provided a modified form of suspending means. In Fig. 2 the terminal rod 22 is the same as that shown in Fig. 3. The rod 22 has attached thereto a turn-buckle 68 having secured thereto the eye 70. The eye 70 has attached thereto the U-shaped member 72 having the hooked ends 74. A second U-shaped member 76 having similar hook shaped ends 78 is provided, and a coil spring 80 held between hooked ends 74 and 78. The U-shaped member 76 has secured thereto the terminal rod 24' the end of which is formed into hook shape similar to that shown in Fig. 3.

The application of the structure of the invention is as follows: The automobile is first mounted at its rear end as shown and described, or in any other suitable way. It is then raised at its front end and temporarily held in any desired manner while the looped ends 26 are placed over the hub 56, the hooked ends having previously been mounted in place. After the looped ends are assembled over the hub the spacer 66 is placed on the hub cap 58 and the hub cap screwed into position. By now suitably turning the spring 40, the proper tension may be obtained and the four suspension means 20 adjusted to the desired position. If desired the looped ends may first be attached to the hubs and the hooked ends hooked into place when the vehicle is raised. Either method is satisfactory.

As a result of the invention the vehicle is held in an inclined position with the front end resiliently suspended. In case the enclosure or box car is given a sudden jolt or jar, as is a frequent occurrence in transportation, the springs 40 will allow a certain amount of give to the front of the vehicle and allow it to move at the rear axle, the rear mounting permitting pivotal movement and the pneumatic tires allowing a certain amount of play and resiliency in the blocks or chocks 12. This resilient mounting, while preventing the vehicle from tearing or breaking loose from its moorings will at the same time afford a suspension which will prevent jolts and jars from being transmitted to the vehicle and thereby insure a better transportation.

The suspension of the vehicle is entirely by resilient means in the form of springs acting under tension in all directions and either or both ends may be supported by similar resilient tension means. The suspension means extend, as will be seen from Fig. 1, in divergent relation from the vehicle axle to the car walls. If desired, the suspension means may be attached to any suitable part of the vehicle other than the axle.

I claim:

1. In a means for supporting vehicles for transportation, an inclosure for the vehicles, means for supporting one end of a vehicle on the inclosure floor to prevent lateral and longitudinal movement of the vehicle, and means for resiliently suspending the other end off the floor of the inclosure.

2. In a means for supporting vehicles for transportation, an inclosure for the vehicles, means for supporting the rear end of a vehicle on the inclosure floor to prevent lateral and longitudinal movement of the vehicle, and means for resiliently suspending the front end off the floor of the inclosure.

3. In a means for supporting vehicles for transportation, an inclosure for the vehicles, means for supporting one end of the vehicle on the inclosure floor, and means attached to the vehicle and to the sides of the inclosure for resiliently suspending the other end off the inclosure floor.

4. In a means for supporting vehicles for transportation, an inclosure for the vehicles, means for supporting the rear end of the vehicle on the inclosure floor, and means attached to the front end of the vehicle and to the inclosure sides for resiliently suspending the front end off the inclosure floor.

5. In a means for supporting vehicles for transportation, an inclosure for the vehicles, means for supporting one end of the vehicle on the inclosure floor, and resilient means attached at one end to the inclosure sides and at the other end to the vehicle hub to support the other vehicle end off the inclosure floor.

6. The invention of claim 5, said resilient means comprising a plurality of rods having an interposed spring.

7. The invention of claim 5, said resilient means connected to said inclosure sides at widely spaced points and comprising a plurality of elements each having an interposed spring.

8. In a means for supporting vehicles for transportation, an inclosure for the vehicles, means for supporting the rear end of the vehicle on the inclosure floor, and resilient means attached at one end to the inclosure sides and at the other end to the front wheel hubs to support the front of the vehicle off the inclosure floor.

9. In a means for supporting vehicles for transportation, an inclosure for the vehicles, means for supporting one vehicle end on the inclosure floor, a hub at the other vehicle end, resilient means positioned on said hub and to the inclosure sides for suspending said other end off the vehicle floor, and means on the hub cap for holding one end of said resilient means.

10. The invention of claim 9, said last named means comprising a flange.

11. The invention of claim 9, and a spacer on said hub to form a tight connection of said means and to prevent rattle.

12. The invention of claim 9, said resilient means having a loop end for engagement over said hub.

13. In a means for supporting vehicles for transportation, an inclosure in which the vehicles are mounted, means for supporting one end of the vehicle on the inclosure floor to prevent lateral and longitudinal movement, and resilient mounting means attached to each vehicle and the inclosure and acting solely through tension to hold the other end of said vehicles off the floor.

14. In a means for supporting vehicles for transportation, an inclosure in which the vehicles are mounted, means for supporting one end of the vehicle on the inclosure floor to prevent lateral and longitudinal movement, and resilient mounting means attached to the vehicle axles and to the inclosure sides and acting solely through tension to hold the other end of said vehicles off the floor.

15. In a mounting means for a vehicle, in combination with the vehicle axle, an inclosure for the vehicle, means for supporting one end of the vehicle on the inclosure floor to prevent lateral and longitudinal movement, and resilient means attached to the vehicle axle and to the inclosure and acting solely through tension to hold the other end of the vehicle off the floor.

16. In a mounting means for supporting vehicles for transportation, an inclosure in which the vehicles are mounted, means for supporting one end of the vehicle on the inclosure floor to prevent lateral and longitudinal movement, and resilient means acting solely through tension and attached to both vehicles and inclosure and extending in divergent relation between the vehicles and the inclosure resiliently to hold said vehicles off the floor.

17. In a mounting means for supporting a vehicle for transportation, an inclosure in which the vehicle is mounted, means for supporting one end of the vehicle on the inclosure floor to prevent lateral and longitudinal movement, and resilient means acting solely through tension and attached to both vehicle and inclosure and extending in divergent relation from the vehicle to the inclosure walls resiliently to hold said vehicle off the floor.

18. In a mounting means for supporting a vehicle for transportation, an inclosure in which the vehicle is mounted, means for supporting one end of the vehicle on the inclosure floor to prevent lateral and longitudinal movement, and resilient means acting solely through tension and attached to the vehicle axle and to the inclosure walls and extending in divergent relation from the vehicle axle resiliently to hold said vehicle off the floor.

In testimony whereof I affix my signature.

RAYMOND W. CHALMERS.